United States Patent [19]

Abe et al.

[11] 4,220,547

[45] Sep. 2, 1980

[54] DIELECTRIC PASTE FOR THICK FILM CAPACITOR

[75] Inventors: Katsuo Abe; Noriyuki Taguchi, both of Yokohama; Nobuyuki Sugishita, Yokosuka; Tokio Isogai, Fujisawa, all of Japan

[73] Assignee: Hitachi, Ltd., Japan

[21] Appl. No.: 971,106

[22] Filed: Dec. 19, 1978

[30] Foreign Application Priority Data

Dec. 21, 1977 [JP] Japan ................................. 52-152872

[51] Int. Cl.² ............................................. H01B 3/12
[52] U.S. Cl. .................................. 252/63.5; 106/39.8; 106/73.31; 361/320; 361/321
[58] Field of Search ............................ 252/63.5, 63.2; 361/321, 320; 106/39.8, 73.31

[56] References Cited

U.S. PATENT DOCUMENTS

| | | | |
|---|---|---|---|
| 2,528,113 | 10/1950 | Carlson et al. | 106/73.31 X |
| 3,666,505 | 5/1972 | Hoffman et al. | 361/321 X |
| 3,679,440 | 7/1972 | Mason | 252/63.5 X |
| 4,010,133 | 3/1977 | Nakayama | 260/29.6 TA |

*Primary Examiner*—Harris A. Pitlick
*Attorney, Agent, or Firm*—Craig & Antonelli

[57] ABSTRACT

A dielectric paste for a thick film capacitor comprises barium titanate powder, glass frit, magnetite powder, an organic vehicle and a surface-active agent. A dielectric constant higher than 1,100 is obtained by firing at a temperature of 900° C. or lower.

1 Claim, No Drawings

DIELECTRIC PASTE FOR THICK FILM CAPACITOR

BACKGROUND OF THE INVENTION

This invention relates to a dielectric paste for a thick film capacitor, and particularly to a dielectric paste having a higher dielectric constant than 1,100 even when fired at a temperature of 900° C. or lower.

DESCRIPTION OF THE PRIOR ART

Heretofore, a dielectric paste comprised of barium titanate, glass frit, and an organic vehicle has been fired at a temperature of 1,200° to 1,400° C. When an alloy of Ag-Pd is used as an electrode, the alloy is modified by reaction with the dielectric mixture, etc., when fired at such a high temperature. Thus, an expensive material that is not modified when the dielectric paste is fired, for example, Au, etc. must be used as the electrode.

As a dielectric paste capable of being fired at a lower temperature than that of said dielectric paste and being applied to the Ag-Pd electrode, a dielectric paste comprising 100 parts by weight of a uniform mixture of inorganic powder consisting of 85–99% by weight of barium titanate powder, 0.5–10% by weight of glass frit of bismuthate, and 0.5–5% by weight of $Fe_2O_3$ powder, 1–15 parts by weight of polyacrylic acid ester and maximum 1 part by weight of a surface-active agent is known (Japanese Laid-open Patent Application Specification No. 910/73). When a thick film capacitor is produced from said dielectric paste and the paste for Ag-Pd electrode, firing of the paste can be carried out at 930° C. for 30 minutes, and thus any modification of the Ag-Pd electrode by reaction with the dielectric paste does not take place, and the dielectric constant of the resulting thick film capacitor reaches 975 (at 1 kHz) (Japanese Laid-open Patent Application specification No. 910/73).

However, in order to further improve the workability at the production of thick film capacitor and make the thick capacitor more compact at the same time, it is necessary to further lower the firing temperature of a dielectric paste and increase a dielectric constant of dielectric layer after the firing at the same time.

SUMMARY OF THE INVENTION

An object of the present invention is to provide a dielectric paste having a lower firing temperature than that of the conventional dielectric paste and a higher dielectric constant of a dielectric layer after firing than 1,100.

To attain the object of the present invention, the present inventors have made various studies of dielectric paste compositions, and, as a result, have found an excellent dielectric paste comprising 100 parts by weight of a uniform mixture of inorganic powder consisting of 82.5–92.0% by weight of barium titanate powder, 0.5–15% by weight of glass frit of bismuthate, and 2.5–7.5% by weight of magnetite ($Fe_3O_4$) powder, 1–50 parts by weight of an organic vehicle, and 0.25–5 parts by weight of a surface-active agent. The present dielectric paste has such an advantage that any special binder such as polyacrylic acid ester is not used.

When magnetite ($Fe_3O_4$) powder is used, the resulting dielectric paste can be fired at 900° C., or lower, as compared with the case where the $Fe_2O_3$ powder is used, and furthermore, the dielectric constant of the resulting dielectric layer is higher than 1,100. It seems that this is because the average particle size of the magnetite powder is less than 0.02 $\mu$m, which is far smaller than the average particle size of the $Fe_2O_3$ powder, 1–2 $\mu$m; thus the magnetite powder particles can uniformly surround the barium titanate powder particles having an average particle size of 1–2 $\mu$m, and molten glass can uniformly wet the barium titanate particles by help of the magnetite powder particles at the firing; the barium titanate powder particles themselves are firmly bonded to one another even if sintered at a low temperature, and consequently the dielectric constant of the dielectric layer is increased thereby.

Now, description will be made of materials used in the present invention.

The dielectric is barium titanate powders having an average particle size of 1–2 $\mu$m. The organic vehicle is the ordinary one, for example, ethyl cellulose, methyl cellulose, polyvinyl alcohol, or the like in solution in $\alpha$-terpineol, $\beta$-terpineol, butylcarbitol acetate, tridecanol, or the like, and 1–50 parts by weight of the organic vehicle is added to 100 parts of a uniform mixture of organic powder consisting of barium titanate powder, glass frit of bismuthate, and magnetite powder. Addition of less than 1 part of more than 50 parts by weight of the organic vehicle unpreferably deteriorates a printability. Preferable magnetite ($Fe_3O_4$) powder has an average particle size of 0.02 $\mu$m or less. As the average particle size of the magnetite becomes larger than 0.02 $\mu$m, the uniform surrounding of the barium titanate is hardly attained. The magnetite powder having an average particle size of 0.02 $\mu$m or less can be prepared by adding $FeCl_2$ to water, oxidizing $FeCl_2$, and dehydrating the resulting colloidal oxidation product. $Fe_2O_3$ powder having an average particle size of 0.02 $\mu$m or less cannot be produced, and the ordinary particle size ranges in 1–2 $\mu$m.

Preferable glass frit is a glass frit of bismuthate having an average particle size of 1–2 $\mu$m, comprising 75.1–80.0% by weight of $Bi_2O_3$, 6.5–11.0% by weight of PbO, and 3.5–6.7% by weight of $SiO_2$, the balance being comprised of other metal oxide ($B_2O_3$ and BaO, or $B_2O_3$, $Al_2O_3$ and CaO). When a glass frit of bismuthate having other compositions than the above-mentioned is used, the dielectric constant of the resulting dielectric layer after firing becomes less than 1,100.

Preferable surface-active agent is an anion surface-active agent, and specifically includes sodium oleate, sodium alkylbenzene sulfonate, and polyoxyethylene monolaurate. These can be used alone or in a mixture of two or more.

The present dielectric paste can be prepared by mixing said barium titanate powder, glass frit of bismuthate, magnetite powder and surface-active agent in the presence of an appropriate amount of distilled water in a ball mill, then removing water therefrom by drying, adding said organic vehicle thereto, and kneading the resulting mixture in a roll mill.

Firing temperature of the present dielectric paste is not higher than 900° C., preferably 900°–875° C.

The present invention will be described in detail, referring to Examples.

EXAMPLE 1

Glass frit having an average particle size of 1–2 $\mu$m and compositions shown in Table 1, Nos. 1–4 was admixed with barium titanate powder having an average particle size of 1–2 $\mu$m and magnetite powder having an average particle size of 0.02 μm or less, as shown in Table 2, Nos. 1–18, and 100 parts by weight of the magnetite powder in the inorganic powder consisting of barium titanate, glass frit and magnetite.

Table 1

| No. | Glass frit composition (% by weight) | | | | | | | | |
|---|---|---|---|---|---|---|---|---|---|
| | $Bi_2O_3$ | PbO | $SiO_2$ | $B_2O_3$ | $Al_2O_3$ | CaO | ZnO | BaO | $TiO_2$ |
| 1 | 93.4 | — | — | 2.0 | — | — | — | — | 4.6 |
| 2 | 80.0 | 11.0 | 3.5 | 3.5 | — | — | — | 2.0 | — |
| 3 | 75.1 | 6.5 | 6.7 | 6.7 | 3.6 | 0.7 | 0.7 | — | — |
| 4 | 64.7 | 15.2 | 11.0 | 1.8 | 2.2 | 3.4 | 1.7 | — | — |

TABLE 2

| No. | Paste Composition | | | Electric characteristics | | |
|---|---|---|---|---|---|---|
| | $BaTiO_3$ (g) | $Fe_3O_4$ (g) | Glass frit | Dielectric constant (at 1 kHz) | Dielectric loss tangent (% at 1 kHz) | Dielectric breakdown voltage (Vdc/45 μm) |
| 1 | 92 | 2 | 6 ⎫ | 780 | 2.1 | — |
| 2 | 89 | 5 | 6 ⎬ Table 1, No. 1 | 1000 | 2.8 | 1120 |
| 3 | 87 | 7 | 6 ⎭ | 700 | 3.9 | — |
| 4 | 92 | 2 | 6 ⎫ | 1040 | 1.6 | — |
| 5 | 91.5 | 2.5 | 6 ⎪ | 1100 | 1.8 | — |
| 6 | 89 | 5 | 6 ⎬ Table 1, No. 2 | 1150 | 2.6 | 1200 |
| 7 | 86.5 | 7.5 | 6 ⎪ | 1100 | 3.4 | — |
| 8 | 84 | 10 | 6 ⎭ | 650 | 8.0 | — |
| 9 | 92 | 2 | 6 ⎫ | 1000 | 2.0 | — |
| 10 | 91.5 | 2.5 | 6 ⎪ | 1100 | 2.1 | — |
| 11 | 89 | 5 | 6 ⎬ Table 1, No.3 | 1200 | 2.8 | 1500 |
| 12 | 86.5 | 7.5 | 6 ⎪ | 1100 | 3.6 | — |
| 13 | 84 | 10 | 6 ⎭ | 700 | 9.5 | — |
| 14 | 92 | 2 | 6 ⎫ | 800 | 2.0 | — |
| 15 | 89 | 10 | 6 ⎬ Table 1, No. 4 | 1000 | 2.9 | 820 |
| 16 | 87 | 7 | 6 ⎭ | 750 | 7.0 | — |
| 17 | 91 | 3 ($Fe_2O_3$) | 6 ⎫ Table 1, No. 3 | 700 | 2.5 | — |
| 18 | 88 | 6 ($Fe_2O_3$) | 6 ⎭ | 600 | 9.0 | — | resulting mixtures were admixed each with 3 parts by weight of sodium alkylbenzene sulfonate and 13 parts by weight of distilled water. The resulting mixtures were kneaded each in a ball mill for 4–8 hours, and then dried to evaporate water, whereby uniformly mixed powder was obtained. 103 parts by weight of the resulting mixed powder was admixed each with 30 parts by weight of an organic vehicle (a solution of ethyl cellulose in α-terepineol), and kneaded for 30 minutes in a roll mill, whereby dielectric pastes were obtained.

Then, a silver-palladium electrode paste was printed on alumina substrates and fired at 900° C. for 10 minutes. Then, said dielectric pastes were printed on the fired substrates, and the silver-palladium paste was printed further thereon, and fired at 900° C. for 10 minutes, whereby thick film capacitors were obtained. Dielectric constant and dielectric loss tangent of these thick film capacitors were measured at a frequency of 1 kHz, and at the same time dielectric breakdown voltage thereof was measured. The results are shown in the column "Electric Characteristics" in Table 2.

It was found that the dielectric pastes having a dielectric constant of higher than 1,100, a dielectric loss tangent of less than 3.6% and a better dielectric breakdown voltage were those containing the glass frit of Nos. 2 and 3 in Table 1, and further 2.5–7.5% by weight of the

EXAMPLE 2

Glass frit having an average particle size of 1–2 μm and a composition shown in Table 1, No. 3 was admixed with the same barium titanate powder and magnetite powder as in Example 1 as shown in Table 3, Nos. 1–4, and 100 parts by weight of the resulting mixture was mixed each with 0.25–8 parts by weight of sodium alkylbenzene sulfonate in the same manner as in Example 1, and kneaded and dried, whereby uniformly mixed powder was obtained, 100.25–108 parts by weight of the mixed powder was admixed with 30 parts by weight of an organic vehicle in the same manner as in Example 1, and kneaded, whereby dielectric pastes were obtained.

Then, thick film capacitors were prepared, using these dielectric paste, and dielectric constant, dielectric loss tangent and dielectric breakdown voltage were measured in the same manner as in Example 1. The results are shown in Table 3, column "Electric Characteristics".

It was found that dielectric pastes having a higher dielectric constant than 1,100, a low dielectric loss tangent and a good dielectric breakdown voltage were those containing 0.25–5 parts by weight of sodium alkylbenzene sulfonate per 100 parts of the mixed powder consisting of barium titanate powder, glass frit and magnetite powder.

Table 3

| No. | Paste mixture | | | | Electric characteristics | | |
|---|---|---|---|---|---|---|---|
| | $BaTiO_3$ (g) | Glass frit, Table 1, No. 3 | $Fe_3O_4$ (g) | Sodium alkylbenzene sulfonate (g) | Dielectric constant (at 1kHz) | Dielectric loss tangent (% at 1kHz) | Dielectric breakdown voltage (Vdc/40 μm) |
| 1 | 90 | 5 | 5 | 8 | 1015 | 3.2 | 1081 |

Table 3-continued

| | Paste mixture | | | | Electric characteristics | | |
|---|---|---|---|---|---|---|---|
| No. | BaTiO$_3$ (g) | Glass frit, Table 1, No. 3 | Fe$_3$O$_4$ (g) | Sodium alkyl-benzene sulfonate (g) | Dielectric constant (at 1kHz) | Dielectric loss tangent (% at 1kHz) | Dielectric breakdown voltage (Vdc/40 μm) |
| 2 | 90 | 5 | 5 | 5 | 1200 | 2.8 | 1300 |
| 3 | 90 | 5 | 5 | 0.5 | 1200 | 2.8 | 1370 |
| 4 | 90 | 5 | 5 | 0.25 | 1173 | 2.8 | 1464 |

EXAMPLE 3

Glass frit having an average particle size of 1-2 μm and a composition shown in Table 1, No. 3 were admixed with the same barium titanate powder and magnetite powder as in Table 1, as shown in Table 4, Nos. 1-5, and 100 parts by weight of the resulting mixture was admixed with 3 parts by weight of sodium alkylbenzene sulfonate in the same manner as in Example 1, kneaded and dried, whereby uniformly mixed powder was obtained. 103 parts by weight of the mixed powder was admixed with 30 parts by weight of the organic vehicle as in Example 1, and kneaded, whereby dielectric pastes were obtained.

Thick film capacitors were prepared in the same manner as in Example 1, using these dielectric pastes, and dielectric constant, dielectric loss tangent, and dielectric breakdown voltage were measured in the same manner as in Example 1. The results are shown in Table 4, column "Electric Characteristics".

It was found that the dielectric paste having a higher dielectric constant than 1,100, a low dielectric loss tangent and a good dielectric breakdown voltage were those containing 82.5-92.0% by weight of barium titanate powder and 0.5-15% by weight of glass frit of bismuthate.

Table 4

| | Paste composition | | | Electric characteristics | | |
|---|---|---|---|---|---|---|
| No. | BaTiO$_3$ (g) | Glass frit Table 1, No. 3 (g) | Fe$_3$O$_4$ (g) | Dielectric constant (at 1 kHz) | Dielectric loss tangent (% at 1 kHz) | Dielectric breakdown voltage (Vdc/40 μm) |
| 1 | 80 | 18 | 2 | 800 | 1.4 | 950 |
| 2 | 82.5 | 15 | 2.5 | 1110 | 2.0 | 1100 |
| 3 | 90 | 5 | 5 | 1200 | 2.8 | 1500 |
| 4 | 92 | 0.5 | 7.5 | 1130 | 2.2 | 1650 |
| 5 | 94 | 0.1 | 5.9 | 1000 | 1.5 | 1750 |

What is claimed is:

1. A dielectric paste, which comprises 100 parts by weight of a uniform mixture of inorganic powder consisting of 82.5-92.0% by weight of barium titanate powder, 0.5-15% by weight of glass frit of bismuthate, and 2.5-7.5% by weight of magnetite powder, 1-50 parts by weight of an organic vehicle, and 0.25-5 parts by weight of a surface-active agent, a dielectric constant being higher than 1100 at a firing temperature of 900° C. or less, and wherein the barium titanate powder has an average particle size of 1-2 μm, the glass frit of bismuthate has an average particle size of 1-2 μm and a composition of 75.1-80% by weight of Bi$_2$O$_3$, 6.5-11.0% by weight PbO, and 3.5-6.7% by weight of SiO$_2$, the balance being B$_2$O$_3$ and BaO, or a composition of 75.1-80% by weight of Bi$_2$O$_3$, 6.5-11.0% by weight of PbO, and 3.5-6.7% by weight of SiO$_2$, the balance being B$_2$O$_3$, Al$_2$O$_3$ and CaO, the surface-active agent is at least one compound selected from sodium oleate, sodium alkylbenzene, sulfonate, and polyoxyethylene monolaurate, and the magnetite powder has an average particle size of 0.02 μm or less.

* * * * *